United States Patent [19]

Sutterlin

[11] 4,333,177

[45] Jun. 1, 1982

[54] TEST CONTROL CIRCUIT FOR MULTICHANNEL APPARATUS SUCH AS TAPE RECORDERS AND THE LIKE

[75] Inventor: Philip H. Sutterlin, Sunnyvale, Calif.

[73] Assignee: Ampex Corporation, Redwood City, Calif.

[21] Appl. No.: 90,050

[22] Filed: Oct. 31, 1979

[51] Int. Cl.³ .................. G01R 31/28; G06F 11/00
[52] U.S. Cl. .................................. 371/15; 324/73 R; 360/31; 371/25
[58] Field of Search ............................ 371/15, 17, 25; 324/73 R, 73 AT, 212, 227; 360/31; 364/900 MS File

[56] References Cited

U.S. PATENT DOCUMENTS

| | | | |
|---|---|---|---|
| 3,519,761 | 7/1970 | Trost | 360/31 |
| 3,522,532 | 8/1970 | McCoy | 360/31 |
| 3,686,682 | 8/1972 | Behr et al. | 324/212 |
| 3,831,149 | 8/1974 | Job | 324/73 R |
| 4,103,338 | 7/1978 | Cizmic et al. | 360/31 |
| 4,180,203 | 12/1979 | Masters | 324/73 R |

Primary Examiner—Charles E. Atkinson
Attorney, Agent, or Firm—George B. Almeida; Joel D. Talcott

[57] ABSTRACT

A test control circuit includes a channel selector circuit and input and output buffers, which cooperate with input/output buses and respective latches of the multichannel apparatus, to allow an operator to select one or more input buses, and one or more output buses, of a respective channel or channels of the multichannel apparatus. Thus the circuit allows selectively applying an input test signal to one or more channels via the front of the apparatus, while selectively monitoring the resulting output signal from the channel or channels also via the front of the apparatus. An exemplary purpose of the test control system is to facilitate the channel alignment and head azimuth adjustment of, for example, a multichannel audio tape recorder.

14 Claims, 5 Drawing Figures

FIG_1

FIG_2

FIG_3

TEST CONTROL CIRCUIT FOR MULTICHANNEL APPARATUS SUCH AS TAPE RECORDERS AND THE LIKE

BACKGROUND OF THE INVENTION

1. Field

The invention relates to means for automatically selecting a channel from a plurality of channels in an electronic apparatus, and particularly to a test control board which performs time shared access to, and selection of, a channel or channels of a multichannel audio tape recorder for alignment, azimuth, record bias, equalization, etc., adjustment purposes.

2. Prior Art

A requirement for successfully operating an apparatus having a plurality of channels is that the multiple heads, channels, record circuits, etc., be aligned, adjusted, etc., i.e., be properly operative. To perform such channel alignments and adjustments, an operator may apply a test signal to the input of a channel while monitoring the output thereof. Heretofore, access to the channels was made via the back of the apparatus, and it was necessary to manually connect a conductor to the input and to the output of each channel to be tested. Obviously, in an apparatus with many channels, i.e., 16, 24, etc., such a procedure is time consuming, cumbersome and totally inefficient.

More recently, a switching system has been used in audio tape recorders, wherein a test circuit includes a jack which allows coupling an external test circuit to the inputs of all the channels of the recorder. However, the outputs of the channels must be manually individually connected and disconnected at the back of the recorder. Thus the system fails to provide an automatic, logic oriented, channel selection system capable of any flexibility in rapidly connecting an external test circuit to one or more inputs, while selectively coupling an associated external monitoring circuit to any output, of one or more given channels.

SUMMARY OF THE INVENTION

The invention overcomes the shortcomings of the prior art by providing a test control circuit with direct memory access to the control microprocessor, or hard-wired control system, of a multichannel recorder, which test control circuit thus provides highly sophisticated and versatile time shared access to the input/output buses of respective channels in the multichannel recorder. Thus an operator may align, adjust, etc., the apparatus without having to connect and disconnect to each and every channel input and output in the back of the apparatus, or without having to use a mixing console to select the channel to which a test signal is to be applied and monitored.

To this end, the multichannel recorder includes multiple channels with respective input and output buses, and latches integral with each channel. The test control circuit includes a display counter/display which may be incremented or decremented to provide a channel digital number, in response to a channel number request via a channel select oscillator. In response to the channel request, an address pointer circuit and an associated address bus counter count through all of the multiple channels. Digital comparator means compares the displayed channel digital number with the consecutive channel digital numbers being counted by the address pointer circuit, and generates an enable signal when the two numbers are equal, and a disable signal when the numbers are not equal. The address bus counter tracks the address pointer circuit and provides digital information which identifies the channel which was initially selected. The enable signal appears on a data bus buffer, which sets the latch of the channel requested to couple the channel input/output buses to the external test signal generator and monitor apparatus, and which clears the latches of the channels which are not selected. Input and output buffers integral with the test control circuit provide an interface between the external test/monitor apparatus.

The test control circuit allows the application of the external test signal to all the channels simultaneously, and further provides an auxiliary output bus which generally monitors the displayed channel, but may be set to monitor a selected channel, e.g., channel one, regardless of which channel is selected and displayed.

DESCRIPTION OF THE PREFERRED EMBODIMENTS

Figure 1:
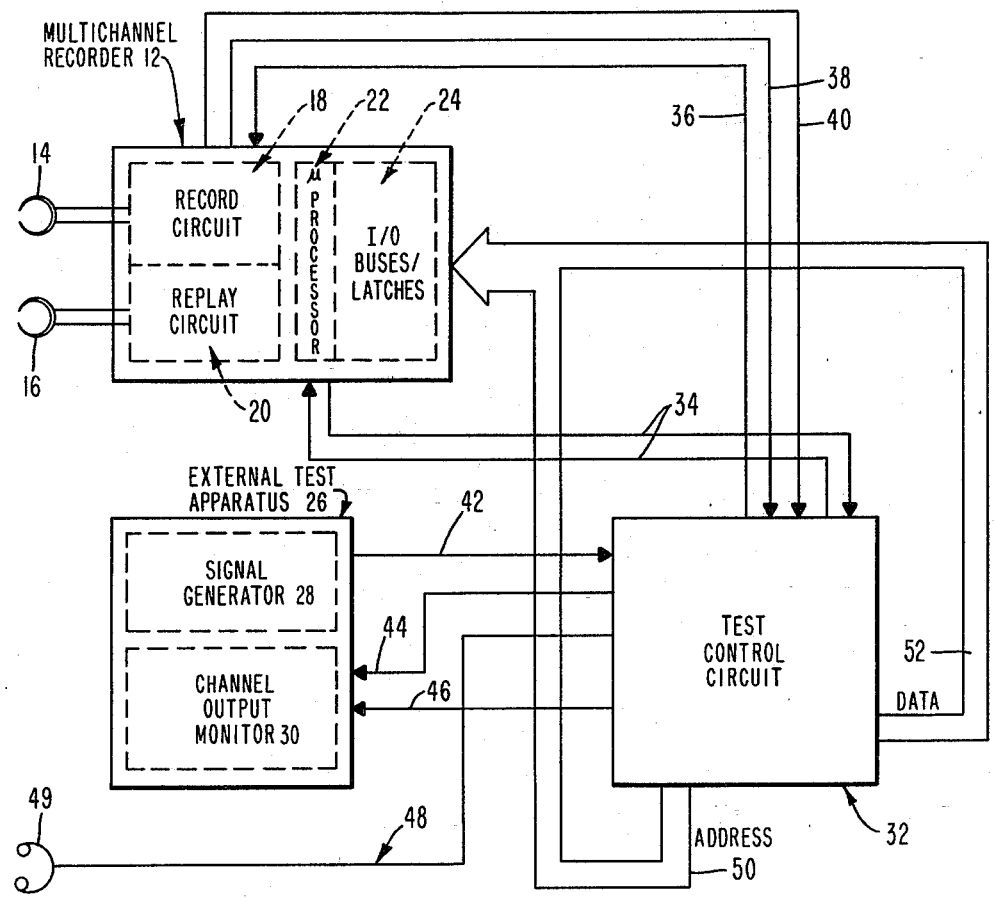
FIG. 1 is a block diagram of the test control circuit as employed with a multichannel tape recorder and an external test/monitor apparatus.

Referring to FIG. 1, a multichannel apparatus, such as an audio tape recorder 12, includes multiple write and read heads 14, 16, respectively, coupled to associated channels of the multiple channels forming the record and reproduce circuits 18, 20. A microprocessor system 22 provides control of the usual recorder switching functions, as well as direct memory access to the recorder to allow channel selection via respective channel input and output buses and associated latches 24.

An external test/monitor apparatus 26 is provided and includes, for example, a signal generator 28 for generating a selected test signal for application to the channels, and a channel output monitor 30 for monitoring the channel output signals.

In accordance with the invention, a test control circuit 32 provides means for requesting and receiving access to one or all of the input buses, and to one or more output buses, of the channels in the multichannel recorder 12. The test control circuit 32 is coupled to the recorder 12 and to the external test apparatus 26 via; a pair of "hold" and "hold acknowledged" lines 34 to and from the microprocessor 22; a recorder input bus line 36; main and auxiliary recorder output bus lines 38, 40, respectively; a test input bus line 42; main and auxiliary test output bus lines 44, 46, respectively; a main headphone output bus line 48; a recorder address bus 50; and a recorder data bus 52.

Referring now to FIGS. 2-5, the block diagram of the test control circuit 32 in FIG. 1 is shown in greater detail, with the various buses and lines 34-52 similarly numbered. To facilitate the description, the schematic diagram is divided into blocks (see dashed lines) corresponding to the various major components of the test control circuit 32. The circuits of FIGS. 3-5 comprise the means for performing channel selection and, accordingly, are referred to in combination as a channel selector means.

Figure 2:
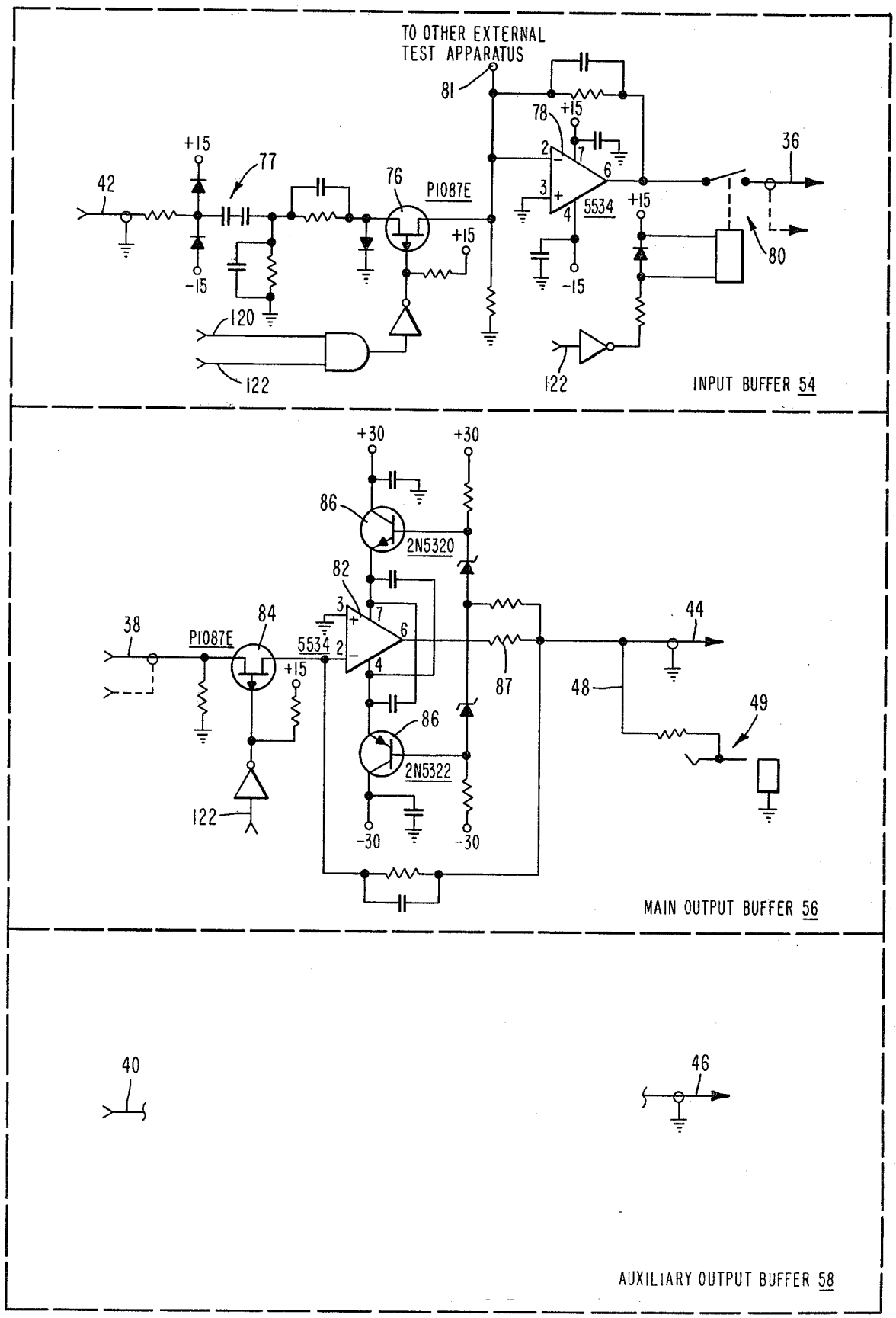
FIGS. 2-5 are schematic diagrams depicting one implementation of the test control circuit of FIG. 1.

Thus, referring first to the blocks of the schematic, FIG. 2 includes input buffer means 54, with the test input bus line 42 connected to the input, and the recorder input bus line 36 connected to the output, thereof. The input buffer means provides a signal drive interface for the test signal from the signal generator 28 to one, or all, of the channels of the recorder 12. The circuit is of low distortion with a high input impedance to prevent loading down the signal generator 28, and also adds some gain to increase the test signal level.

Main output buffer means 56 provides an interface circuit for introducing the output signal received from the recorder channel via the main recorder output bus line 38, to the channel output monitor 30 via the main test output bus line 44. The output signal is also introduced thereby to the headphones 49 via the main headphone output bus line 48. The headphones allow monitoring of alignment tapes in the recorder 12 without hooking up monitoring speakers.

Auxiliary output buffer means 58 is identical to the main output buffer means 56 and, therefore, is depicted by the dashed block. The auxiliary recorder output bus line 40 feeds the channel output signal to the auxiliary output buffer means 58, which routes the signal to the channel output monitor 30 via the auxiliary test output bus line 46. The output buffers 56, 58 provide a summing junction means for common connection thereto of the channel output buses.

The main and auxiliary output buffer buses generally receive the same signal, since they are both generally coupled to the same channel. However, the test control circuit 32 provides for the selection of the main and/or the auxiliary output buffer buses in order to monitor different functions of the recorder. For example, the main output buffer 56 may monitor the reproduced channel of the recorder 12, while the auxiliary output buffer means 58 may monitor the input channel of the recorder. In addition, the auxiliary output buffer 58 may continuously monitor channel 1, while the main output buffer 56 continues to track the display commensurate with consecutive channel selection. A comparison of the main and auxiliary output buffer buses thus may readily be made to provide comparing two output signals from the recorder 12. Such a condition is desirable in feeding a two-channel scope, as well as for phasing adjustments on the recorder.

Figure 3:
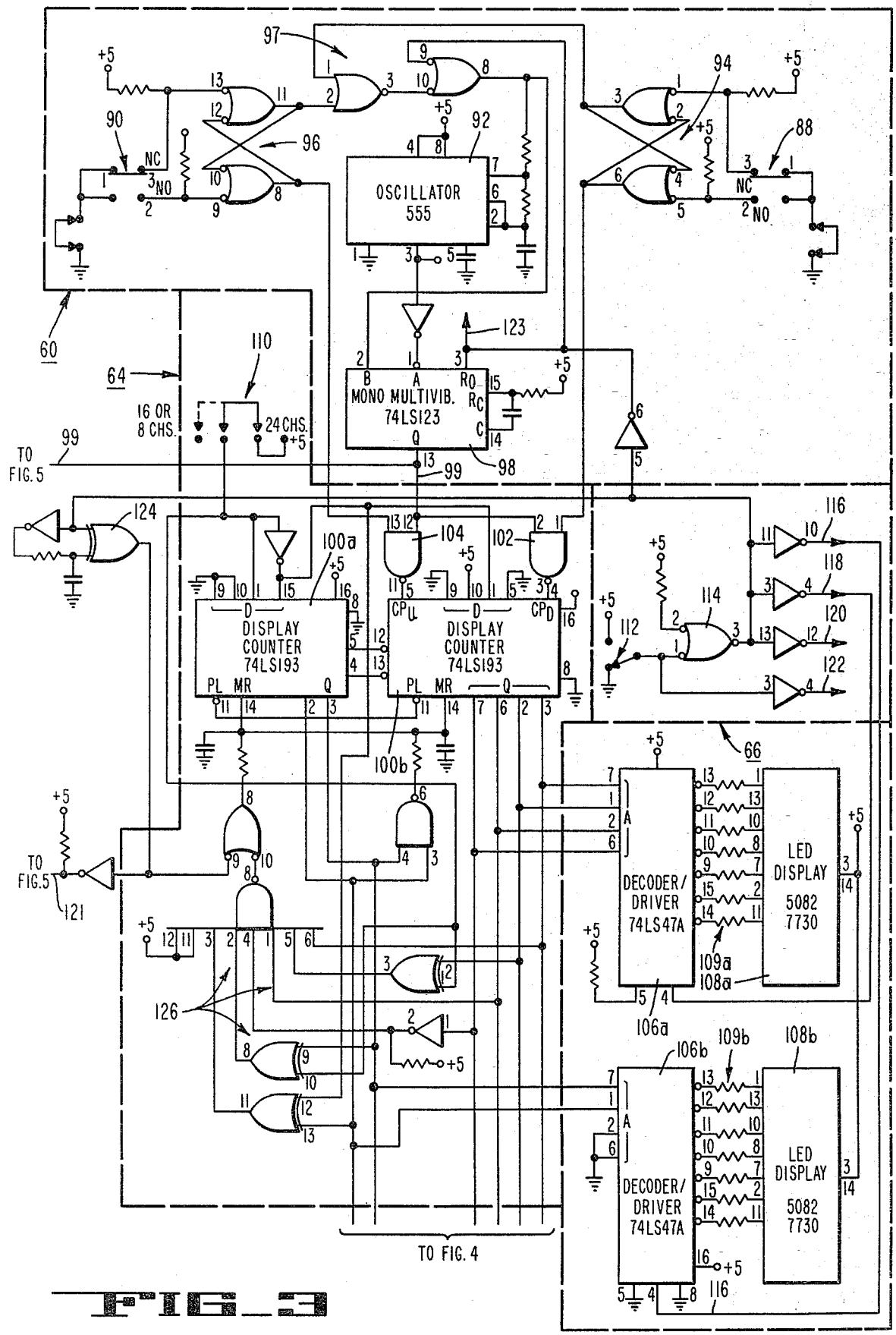
Figure 4:
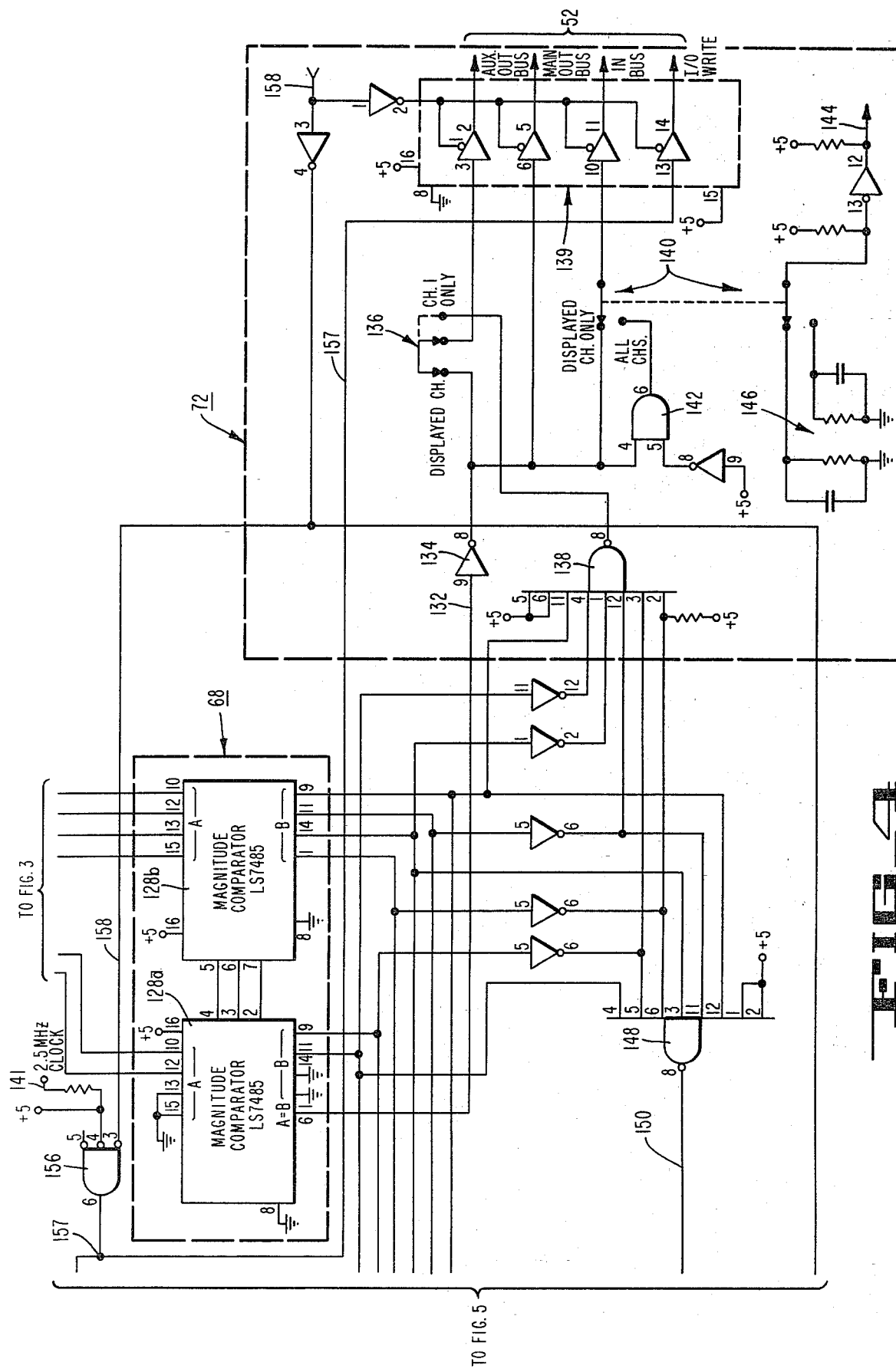
Figure 5:
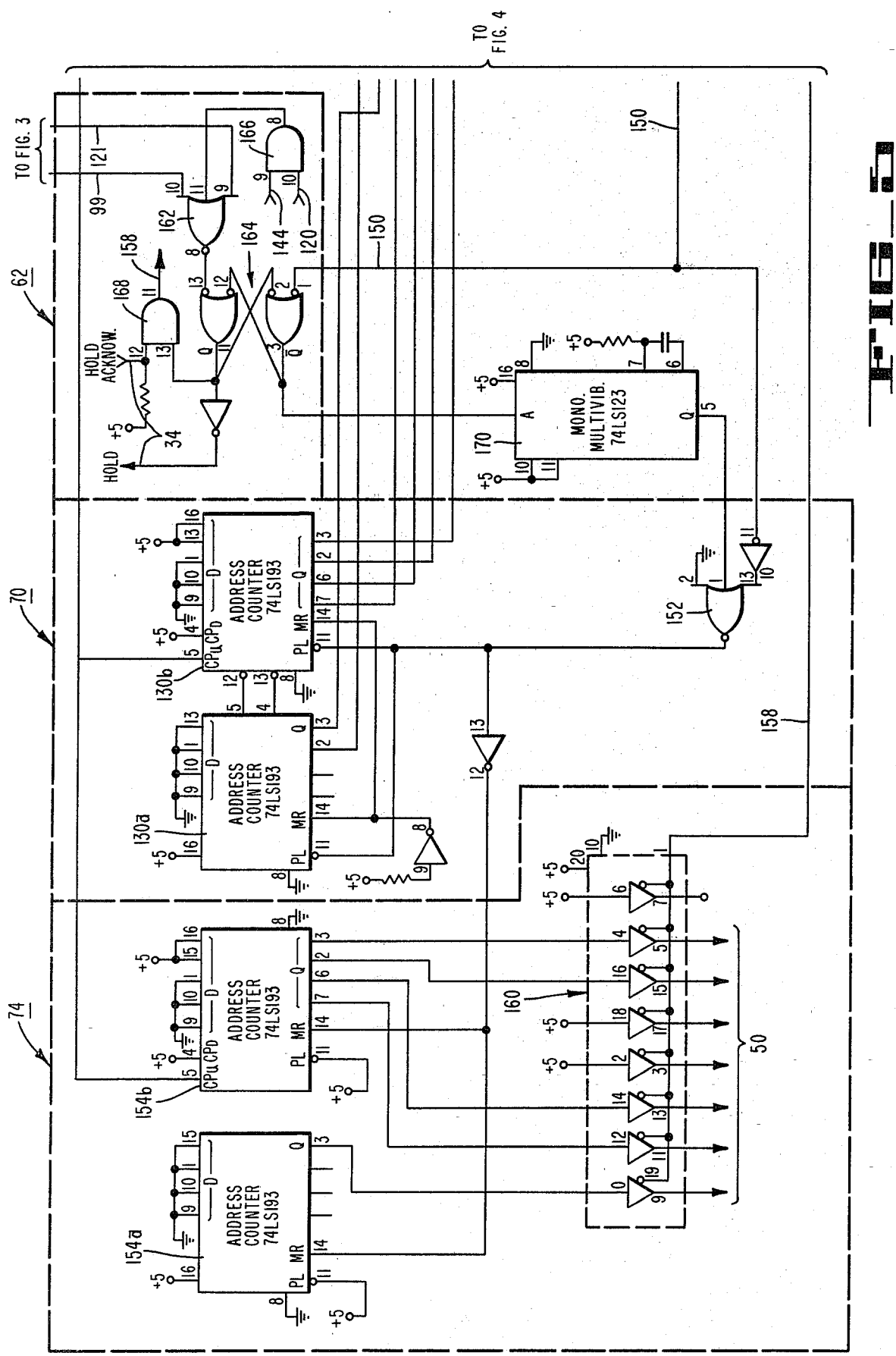

Referring to the dashed blocks of FIG. 3, channel select oscillator means 60 provides an interface between the operator and the test control circuit 32 and, more particularly, to the channel selector means of previous mention (which includes the blocks/schematic of FIGS. 3–5). The means 60 is coupled to a direct memory access (DMA) interface 62 (FIG. 5), to display counter means 64 and, thence, to display means 66. The channel request from the channel select oscillator means 60 determines whether the display counter 64 increments or decrements once, to select the next higher or lower channel, or whether it continuously counts up or down until it reaches the last channel at a rate visible on the display means 66. Then the count rolls over to zero if incrementing, or rolls under if decrementing, and continues counting up, or down, respectively, again.

Referring also to the dashed blocks of FIGS. 4, 5, the display counter means 64 also is coupled to digital magnitude comparator means 68, which, in turn, is coupled to address pointer means 70. When a channel request is entered via the channel select oscillator means 60, the address pointer means 70 begins to count through the channels. When the digital number from the display counter means 64, and that from the pointer means 70 are equal, the comparator means 68 provides a special, i.e., enable, signal to data bus buffer means 72, which in turn closes the latches of the recorder latches 24 corresponding to the selected channel. The specific channel, and thus latches, are determined by address bus counter means 74, which tracks the address pointer means 70 and determines the channel to which the data bus buffer means 72 information is applied.

When the digital numbers from the display counter means 64 and the address pointer means 70 are not equal, the digital comparator means 68 provides a disable signal, which, in effect, clears the recorder latches of the respective channel to insure that the channel is not connected to the external test apparatus 26. The circuit continues to count through all the channels until all channel latches 24 are cleared, except for the latches which corresponds to the channel that was selected and displayed on the display means 66.

Referring now to the schematic diagrams within the dashed blocks, in the schematic of FIG. 2, the input buffer means 54 is coupled to the signal generator 28 via the line 42 and thence, to a FET switch 76 via a diode and capacitor network 77. The capacitors protect the recorder 12 from damage such as caused by connecting the input buffer means 54 to a D.C. power supply, and the diodes protect it from large amplitude signals. The FET switch 76 responds to signals from a bus control (on/off) switch 112 (FIG. 3) on lines 122 and 120, further described infra. The negative input of an operational amplifier 78 is coupled to the FET switch 76 and thence, via the contact of a read relay 80, to the line 36 which extends to the recorder 12. The read relay is enabled by the signal from the switch 112 via the line 122. An input 81 to the operational amplifier 78 is used to input other test signals from other external test apparatus, e.g., record bias, equalization, etc., adjusting apparatus, wherein the test control circuit 32 provides the selection and access to the channels, as described herein.

The main (and auxiliary) output buffer means 56 (and 58) provide interface circuitry between the test apparatus 26 and the recorder 12, via lines 38 (and 40), respectively. Since the main and auxiliary output buffer means 56, 58 are identical, only the former is shown and described. Line 38 is fed to the negative input of a boot strap type operational amplifier 82 via a FET switch 84, wherein the latter also responds to the signal on line 122. Amplifier 82 includes the transistors 86 and allows large signal swings, whereby very large signals may be handled via the main and auxiliary output buffers 56, 58 without distorting the waveforms that are present. A resistor 87 protects the circuit against damage due to a possible short circuit. The amplifier 82 is coupled to the channel output monitor means 30 via the line 44, and to the headphones 49 via the line 48. Similarly the auxiliary output buffer amplifier (not shown) is coupled to the channel output monitor means 30 via the line 46 depicted in the FIG. 2.

The FET switches 76, 84 and the read relay 80 are used to disconnect the input and output buffer means 54, 56 from the input and output buses of the tape recorder 12, when the test control circuit 32 is not being used. At such times, other apparatus accessory to the tape recorder 12 may use the recorder input and output buses.

Referring now to FIG. 3, the channel select oscillator means 60 includes decrement and increment push buttons 88, 90, respectively, which provide the interface between an operator and the channel selector means (FIGS. 3-5) of the test control circuit 32. The push buttons 88, 90 are coupled to an oscillator 92 via latches 94, 96 and various gates 97 and, thence, to a monostable multivibrator 98. The push buttons 88, 90 are "debounced" via latches 94, 96. The multivibrator 98 is coupled via a line 99 to the count down and count up inputs of a display counter 100a, 100b via respective NAND gates 102, 104. The latters' other inputs are coupled to the decrement and increment push buttons 88, 90, respectively, via latches 94, 96. The push buttons are used to request a specific recorder channel which, in turn, changes the channel display on display means 66. Because of the effect of the debounce gates/latches, when the increment button 90 is tapped once, a single pulse is fed to the display counter 100b, and the channel display means 66 increments once to the next channel number. If the increment button 90 is held down, the oscillator 92 continuously increments the display counter means 64, and the display continues to count up to the last channel number at a rate determined by the oscillator 94, and which can be seen on the display. The count then rolls over, i.e., returns to zero, and the display counter 100a,b resumes counting up.

The decrement push button 88 operates in similar manner, but causes the display counter 100a,b to count down through the channel numbers rather than up, when button 88 is held down. When the count reaches zero it rolls under to the highest channel number, and the display counter 100a,b resumes counting down until the push button 88 is released.

The Q outputs of the display counter 100a,b are coupled to the corresponding A inputs of a BCD-to-seven segment decoder/driver 106a, 106b and thence to a LED digital display 108a, 108b, via series current limiting resistors 109a, 109b, wherein the combination provides two displays for a two-digit number. Display 108b provides the first digit and display 108a, the second digit of the LED displayed number. The display can be incremented or decremented, zero through the highest channel number (e.g., 16, 24, etc., in a 16, 24, etc., channel recorder). The zero channel defines the condition wherein the input and output buffers are connected to the recorder 12, but the signal is not being routed to any of the channels.

Although the test control circuit 32 may be employed with any number of channels, of various types of machines, a primary use for the circuit is with a 16 or 24 channel audio tape recorder. Thus the display counter portion 100a is coupled at two D inputs thereof, to a channel select jumper 110, which allows selection of a 16 or 24 channel display system by suitable positioning of the jumper 110.

A bus control on/off switch 112 turns the circuit 32 on or off. When switch 112 is on, the display means 108a,b are lit, and vice versa. The bus control switch 112 is coupled to a NOR gate 114, and provides voltage outputs 116, 118, 120, 122 via respective inverters, for use in the circuit, as depicted by the lines 116–122. The NOR gate 114 output is fed also to an exclusive OR gate 124, which couples to the DMA interface circuit 62 (FIG. 5) via line 121, and also to a NOR gate of several exclusive OR and NAND gates 126 which are connected between the display counter 100a and 100b.

The display counter 100a,b holds the digital information that represents the channel which is selected. When the counter is incremented or decremented it then holds the information representing the new channel. For a 24-channel apparatus, it is necessary to display sequentially 24 different numbers on the display means 66. To prevent displaying the next higher number, viz, 25, the exclusive OR and NAND gates 126 reset the counter 100a,b when it increments to the count of 25. If the counter is decrementing, the gates 126 cause the counter to retrace, when the count reaches zero, i.e., go back to channel 24. Thus if the display means 66 displays a higher channel 24, 23, etc., and the operator wishes to select a lower channel 1, 2, etc., it is much quicker to increment first to channel zero and next to the number 1, 2, etc., than it would be to decrement all the way back to the lower channels 1, 2, etc. The digital information representing the selected channel, which is in the display counter 100a,b, then is converted into the actual number representation, and is displayed on the display means 66.

Referring also to FIG. 4, the Q outputs of the display counter 100a,b are also coupled to the corresponding A inputs of a digital magnitude comparator 128a, 128b of digital comparator means of previous mention. The B inputs of the comparator 128a,b are coupled to the corresponding Q outputs of a pointer counter 130a, 130b of the address pointer means 70 (FIG. 5). Thus, the A inputs to the digital comparator 128a,b receive the digital representation of the channel selected. The B inputs to the comparator are cycled, via the address pointer means pointer counter 130a,b, through the channel numbers (i.e., zero to 24). When the digital numbers match, the comparator 128a generates an enable signal at the A=B output thereof on a line 132, which is fed to the data bus buffer means 72 to control the state of the outputs thereof appearing on the recorder data bus 52. The outputs in turn control the state of the latches 24 which connect the input or output bases of the recorder to the test/monitor apparatus 26.

The data bus buffer means 72 includes an inverter 134 in line 132 and a data jumper 136 coupled at a "display all channels" contact thereof to the inverter 134. The common contact of the data jumper 136 is coupled to the auxiliary output bus of bus 52. The other contact of the jumper 136 is a "channel 1 only" contact and is coupled to the lines extending to the B inputs of the digital comparator 128a,b, via various inverters and a multiple-input NAND gate 138 which detects channel one. The "displayed channel" setting of the data jumper 136 provides the same state on the main and auxiliary output bus on bus 52 and thus allows both the main and auxiliary output buffer means 56, 58 to receive the signal from the same channel. When the jumper 136 is set to the "channel 1 only" contact, the auxiliary output bus on bus 52 is held in a state whereby the auxiliary output buffer means 58 continuously monitors channel 1 only, while the main output buffer means 56 continues to track the LED display means 108a,b, showing which channel is selected. Such condition is desirable in order to perform azimuth alignments on the recorder 12.

An I/O write line 157 on data bus 52 provides a strobe signal via a NOR gate 156 and a clock on line 141, which strobe is fed to the input/output buses latches 24 of the recorder 12 to indicate that the data and address information are ready to be looked at.

As shown, the inverter 134 and line 132 are further coupled, via respective triggerable buffers 139, to the main output bus of bus 52. Line 132 is also coupled to the input bus via a "displayed channel only" contact of an input bus data switch 140, or via an AND gate 142 and an "all channels" contact of the switch 140. A second set of contacts, which are tied to the first set, allow coupling a line 144 from a pair of RC networks 146, to an input to the DMA interface circuit 62 (FIG. 5). The latter signals provide the DMA interface circuit with the information that an update of the recorder latches is desired. When the switch 140 is in the "displayed channel only" position, the test signal from input buffer means 54 (FIG. 2) is fed only to the channel shown on the display means 66. When switch 140 is in the "all channels" position, however, the test signal is fed to all the (24) channels of the recorder 12.

The lines which feed the NAND gate 138 also are coupled to another multiple-input NAND gate 148, which then couples to the DMA interface circuit 62 via a line 150, and also to a NOR gate circuit 152 in FIG. 5. The NAND gate 148 detects a number which is one greater than the total number of channels, i.e., in a 24-channel recorder, the number detected is 25.

Referring to FIG. 5, the output of NOR gate circuit 152 is coupled to the PL inputs of the counter 130a,b, and also to the MR inputs of an address counter 154a, 154b of the address bus counter means 74. The count up input to the address counter 154a,b is coupled to the output of the NOR gate 156, (FIG. 4) whose inputs are coupled to ground, to the clock signal (e.g., 2.5 MHz) on line 141 from the recorder system which clocks the circuit 32, and to a microprocessor "hold acknowledged" signal via a line 158 from the DMA interface circuit 62. The output of NOR gate 156 is also fed back to the data bus 52 (FIG. 4) via the line 157 to provide the I/O write signal. The Q outputs from the counter 154a,b provide the channel address information on the recorder address bus 50 of previous mention, via respective triggerable buffers 160. The latter are enabled via the "hold acknowledged" signal on the line 158.

The DMA interface 62 of previous mention provides interfacing between the microprocessor system 22 of the recorder 12 and the test control circuit 32, via lines 34. The recorder 12 includes its own address and data buses, which are employed by the microprocessor system 22 to control the switching of the recorder functions. Since the test control circuit 32 is removed from the microprocessor, in the interests of saving time, the direct memory access approach is employed. Thus, upon selecting a channel via the push buttons 88 or 90, the test control circuit 32 sends up a "hold" request for use of the recorder address and data buses on one of the lines 34 of the interface circuit 62. The "hold" request is initiated by the operator's closing of one of the push buttons 88, 90, and particularly by the resulting Q output on line 99 of the multivibrator 98, via a NOR gate 162 and one input to a latch 164. The other input of latch 164 receives the reset signal from the NAND gate 148 via the line 150. NOR gate 162 receives other inputs from the exclusive OR gate 124 via the line 121, and from an AND gate 166 fed by the lines 120 from the on/off switch 112, and 144 from the data switch 140. The Q output of latch 164 provides the "hold" request. When the microprocessor determines the use of the buses is permissible, it returns the "hold acknowledged" signal back to the DMA interface circuit 62, via the second line of lines 34 and an AND gate 168. The latter signal is fed to the data bus buffer means 72 to enable the buffers 139 on data bus 52, and the amplifiers 160 on address bus 50 via the line 158, to begin to set up the information on the data and address buses. The latter information controls the recorder latches 24 and thus the routing of the test signals to and from the recorder channels. The $\overline{Q}$ output of the latch 164 is fed to the A input of a monostable multivibrator 170, wherein the Q output of the latter is one input to the NOR gate 152.

In actuality, the recorder latches 24 define two-state memory locations which hold information representing the recorder input and output bus states, i.e., on or off. Activating the test control circuit 32 changes the state of the latches to represent the information shown on the channel display means 66. That is, the proper data is set up on the data bus 52, and then the circuit counts through the address bus 50 to latch the information into the recorder latches 24. Thus, the address bus 50 provides information which selects the channel, and the data bus 52 provides the information which connects or disconnects the channel's input or output bus to the external test apparatus.

Accordingly, each time a new channel request is made via either push button 88 or 90, the test control circuit not only reconnects to the new displayed channel but also disconnects any other channels that may have been connected. Thus with each new channel request, the circuit counts through all channels (herein 24) of the multichannel recorder 12 to update all the respective latches 24.

After the microprocessor forwards the "hold acknowledged" signal on line 34 (and then line 158), the pointer counter 130a,b, and the address counter 154a,b, simultaneously begin to count from one to 24. When the counter 130a,b digital output matches that of the display counter 100a,b, the digital magnitude comparator 128a,b generates the enable signal on the A=B output. The resulting low logic state on the data bus 52 sets the recorder latches for the channel requested and displayed and clears all latches corresponding to all other channels.

Once the circuit counts through all (24) channels, the reset NAND gate 148 detects the channel 25 and sends a signal via line 150 to the latch 164, whose Q output goes low to tell the microprocessor that there is no further need for the recorder's data and address buses. The entire process of requesting, receiving, setting up all latch information and returning the input/output buses takes place very rapidly in response to the 2.5 MHz clock input on the line 141, and thus the process is in appearance, instantaneous.

The data bus buffer means 72 includes the data jumper 136 and the data switch 140, which provide means for performing exceptions to the channel procedure of previous description. The data switch 140 allows the application of the test signal from signal generator 28 to all the channels instead of only the displayed channel. That is, the "all channels" position interrupts the enable/disable signal line 132, where the data line is not allowed to change when representing different channels, but is held in a position where all 24 latches of the recorder input bus are closed.

The data jumper 136 allows the auxiliary output buffer means 58 to continuously monitor only channel 1 and not the channel being displayed, while the main output buffer means 56 does monitor the displayed channel. This condition is provided by positioning the data jumper 136 to interrupt enable/disable line 132. The channel 1 detector NAND gate 138 detects the digital number representing channel one, and closes the corresponding latch 24 only when channel 1 is present at the output of the pointer counter 130a,b, and not when the display counter 100a,b output matches counter 130a,b, as previously described. The last procedure allows the operator to make the recorder azimuth alignments and phasing adjustments.

I claim:

1. A test control circuit for selectively coupling the input and output of one or more channels of a multichannel apparatus to selected test signals of external test/monitor means in response to an operator-generated select command and an acknowledgement signal by an associated microprocessor control system, wherein the multichannel apparatus includes input/output buses and respective latches integral with each channel of the multichannel apparatus, comprising the combination of;

channel selector means remote from the multichannel apparatus for supplying digital channel select control signals to the latter for selectively enabling respective latches of the input and output buses of at least one selected channel in the multichannel apparatus, while disabling latches in unselected channels, in response to the operator-generated select command and the acknowledgement signal from the associated microprocessor control system; and input/output bus buffer means responsive to the channel selector means for selectively coupling the external test/monitor means to the selected channels of the multichannel apparatus to supply and receive the test signals as remotely directed by the channel selector means.

2. The circuit of claim 1 wherein the channel selector means includes;

display counter means for generating a digital number representing a selected channel;

means for cyclically counting through a given series of digital numbers corresponding to the multichannel apparatus;

digital comparator means coupled to the display counter means and to the means for cyclically counting for generating an enable signal in response to a comparison between the digital numbers; and wherein the enable signal enables at least one of the respective apparatus latches of the selected channel.

3. The circuit of claim 2 further including;

address pointer counter means defining the means for cyclically counting through the multiple channels to generate digital numbers corresponding thereto;

wherein the digital comparator generates the enable signal when the digital number from the address pointer counter means matches the digital number from the display counter means; and wherein the digital comparator generates a disable signal when the digital numbers do not match to disable the apparatus latches corresponding to the unselected channels.

4. The circuit of claim 3 further including;

means integral with the operator-generated select command for initiating selection of the selected channel and including oscillator means for selectively strobing the display counter means, and wherein the address pointer counter means counts through the channel numbers in response to channel selection initiation to derive the second matching digital number.

5. The circuit of claim 4 wherein the oscillator means provides a pulse in response to the means for initiating channel selection to cause the display counter means to step to a next channel.

6. The circuit of claim 5 wherein the oscillator means provides a series of pulses in response to the means for initiating channel selection to count the display counter means through a plurality of channels.

7. The circuit of claim 6 further including;

address bus counter means integral with the address pointer counter means for tracking the latter to identify the selected channel in the multichannel apparatus when the digital numbers match; and data bus buffer means including an input and an output data bus for receiving the enable signal to close the latch of a selected channel and to clear the latches of unselected channels.

8. The circuit of claim 7 wherein the means for initiating selection includes;

increment and decrement push buttons coupled to the oscillator means for respectively incrementing or decrementing the display counter means; and latch/gate means integral with the push buttons and the oscillator means for generating a pulse upon momentary closure of either push button, and the continuous pulses upon continuous closure of either push button.

9. The circuit of claim 8 further including;

display means coupled to the display counter means for visually displaying a number corresponding to the digital number and thus to the selected channel.

10. The circuit of claim 9 further including;

interface means coupled to the associated microprocessor control system and integral with the channel selector means for generating a hold signal in response to the initiation of channel selection, and for receiving a hold acknowledged signal from the associated microprocessor control system when the multichannel apparatus input/output buses are available.

11. The circuit of claim 10 further including;

reset means coupled to the interface means to provide an indication that the apparatus input/output bus means is coupled to the external test/monitor means.

12. The circuit of claim 11 further including;

channel select jumper means coupled to the display counter means for selecting the number of channels through which the display counter means and the address pointer counter means count, commensurate with the number of channels in the multichannel apparatus.

13. The circuit of claim 12 further including;

an auxiliary output data bus in the data bus buffer means; and data bus jumper means integral with the auxiliary output data bus to direct the latter to continuously set one of selected apparatus latches during multiple channel selection by the means for initiating selection.

14. The circuit of claim 13 further including;

data bus switch means integral with the input data bus of the data bus buffer means to selectively set one or all of selected apparatus latches to apply the test signal to one or all of the channels of the multichannel apparatus.

* * * * *